(12) United States Patent
Watanabe

(10) Patent No.: US 11,035,544 B2
(45) Date of Patent: Jun. 15, 2021

(54) ILLUMINATION DEVICE WITH LASER ELEMENT, ROTATING MIRROR MEMBER AND WAVELENGTH CONVERTER

(71) Applicant: NICHIA CORPORATION, Anan (JP)

(72) Inventor: Kazunori Watanabe, Yokohama (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/036,890

(22) Filed: Sep. 29, 2020

(65) Prior Publication Data

US 2021/0116093 A1  Apr. 22, 2021

(30) Foreign Application Priority Data

Oct. 16, 2019 (JP) .............................. JP2019-189161

(51) Int. Cl.
| | |
|---|---|
| *F21S 41/675* | (2018.01) |
| *F21S 41/176* | (2018.01) |
| *F21V 23/00* | (2015.01) |
| *F21S 41/16* | (2018.01) |
| *F21S 41/37* | (2018.01) |
| *F21W 102/13* | (2018.01) |

(52) U.S. Cl.
CPC .............. *F21S 41/675* (2018.01); *F21S 41/16* (2018.01); *F21S 41/176* (2018.01); *F21S 41/37* (2018.01); *F21V 23/003* (2013.01); *F21W 2102/13* (2018.01)

(58) Field of Classification Search
CPC ..... F21S 41/675; F21S 41/16; F21Y 2115/30; F21V 14/04
See application file for complete search history.

(56) References Cited

U.S. PATENT DOCUMENTS

| | | | |
|---|---|---|---|
| 9,797,577 B2* | 10/2017 | Harada | ................... F21V 13/14 |
| 2008/0094851 A1 | 4/2008 | Engl et al. | |
| 2017/0175968 A1 | 6/2017 | Shimizu et al. | |
| 2018/0188525 A1 | 7/2018 | Kurashige | |

FOREIGN PATENT DOCUMENTS

| | | |
|---|---|---|
| JP | 8-220459 A | 8/1996 |
| JP | 2005-331468 A | 12/2005 |
| JP | 2008-539537 A | 11/2008 |
| JP | 2010-15902 A | 1/2010 |
| JP | 2019-135449 A | 8/2019 |
| WO | WO 2015/190437 A1 | 12/2015 |
| WO | WO 2016/208594 A1 | 12/2016 |
| WO | WO 2017/104167 A1 | 6/2017 |

* cited by examiner

*Primary Examiner* — Robert J May
(74) *Attorney, Agent, or Firm* — Birch, Stewart, Kolasch & Birch, LLP

(57) ABSTRACT

An illumination device includes a laser element, a rotating member including a plurality of flat mirror regions that are disposed along a circumference direction of the rotating member to sequentially reflect laser beams emitted from the first laser element with rotation of the rotating member, and a wavelength conversion member. Each of the laser beams reflected at a corresponding one of the mirror regions is incident on the wavelength conversion member. When viewed in a direction in which a rotation axis of the rotating member extends, the mirror regions are disposed at mutually different angles with respect to respective ones of lines each connecting the rotation axis and the center of a respective one of the mirror regions.

9 Claims, 12 Drawing Sheets

ILLUMINATION DEVICE WITH LASER ELEMENT, ROTATING MIRROR MEMBER AND WAVELENGTH CONVERTER

CROSS-REFERENCE TO RELATED APPLICATION

This application claims priority to Japanese Patent Application No. 2019-189161, filed on Oct. 16, 2019, the entire contents of which are hereby incorporated by reference.

BACKGROUND OF THE INVENTION

1. Field of the Invention

The present disclosure relates to an illumination device.

2. Description of Related Art

In recent years, development of an Adaptive Driving Beam (ADB) headlamps for vehicle headlamps to illuminate only the selected area has been in progress. With the ADB headlamps, for example, light can be projected only to a region in which oncoming vehicles or preceding vehicles do not exist. This allows the driver to have the field of view without obstructing operations of other vehicles. A device employing ADB is described in, for example, PCT Publication No. WO2017104167, which describes a device that includes a laser element, a polygon mirror, and a light-emitting portion containing a phosphor.

SUMMARY

Certain embodiments of the present invention have an object to provide an illumination device in which the scanning range of a laser beam can be expanded.

An illumination device according to one embodiment includes a laser element, a rotating member including a plurality of flat mirror regions that are disposed along a circumference direction of the rotating member to sequentially reflect laser beams emitted from the first laser element with rotation of the rotating member, and a wavelength conversion member. Each of the laser beams reflected at a corresponding one of the mirror regions is incident on the wavelength conversion member. When viewed in a direction in which a rotation axis of the rotating member extends, the mirror regions are disposed at mutually different angles with respect to respective ones of lines each connecting the rotation axis and the center of a respective one of the mirror regions.

Certain embodiments of the present invention can provide an illumination device in which the scanning range of a laser beam can be expanded.

DETAILED DESCRIPTION OF EMBODIMENTS

An illumination device according to one embodiment includes a laser element, a rotating member having a plurality of flat mirror regions that are disposed along a circumferential direction of the rotating member to sequentially reflect laser beams emitted from the laser element with rotation of the rotating member, and a wavelength conversion member. The laser beams each of which is reflected at a corresponding one of the mirror regions is incident on the wavelength conversion member. When viewed from a direction in which a rotation axis of the rotating member extends, the mirror regions are disposed at mutually different angles with respect to respective ones of lines each connecting the rotation axis and the center of a respective one of the mirror regions.

Configurations of the illumination device according to certain embodiments will be described below.

First Embodiment

A first embodiment will be described.

Figure 1:
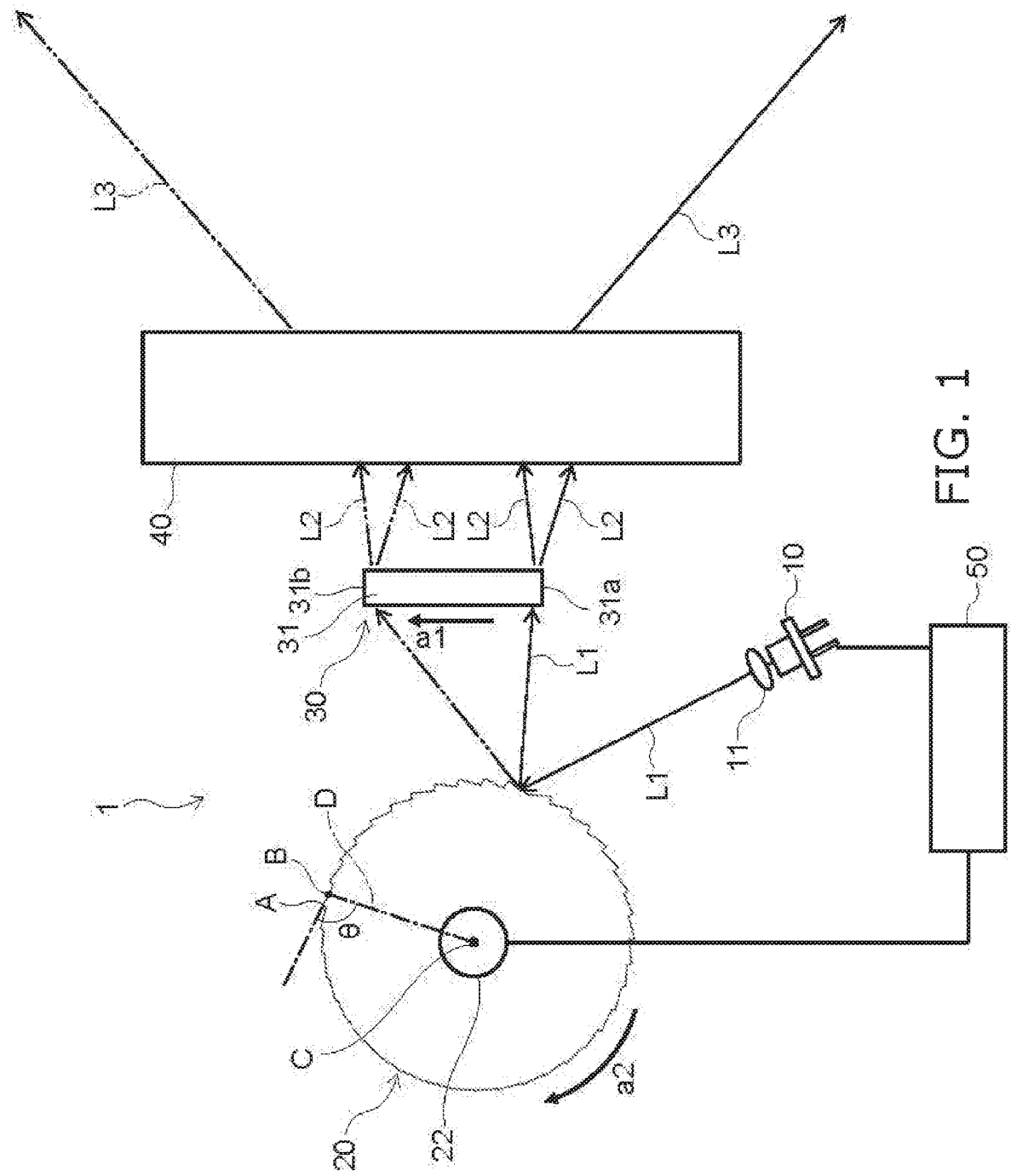
FIG. 1 is a schematic view illustrating an illumination device according to a first embodiment.

FIG. 1 is a schematic view illustrating an illumination device according to the first embodiment.

The illumination device 1 includes at least one laser element 10, a rotating member 20, a wavelength conversion member 30, an optical system 40, and a controller 50.

The rotating member 20 has a plurality of flat mirror regions A that are disposed along a circumferential direction of the rotating member. In the rotating member 20, laser beams L1 emitted from the laser element 10 are sequentially reflected at the plurality of mirror regions A with rotation of the rotating member. When viewed in a direction in which the rotation axis C of the rotating member 20 extends, the plurality of mirror regions A are disposed at mutually different angles θ with respect to respective ones of lines D each connecting the rotation axis C and the center B of a respective one of the mirror regions A. The laser beams L1 reflected at the plurality of mirror regions A are incident on the wavelength conversion member 30. Light L2 emitted from the wavelength conversion member 30 is projected by the optical system 40. The controller 50 controls operations of the laser element 10 and the rotating member 20.

The structure will be described below in detail. Also, the direction in which the rotation axis C of the rotating member 20 extends may be hereinafter referred to as "an upper-lower direction".

Figure 2:
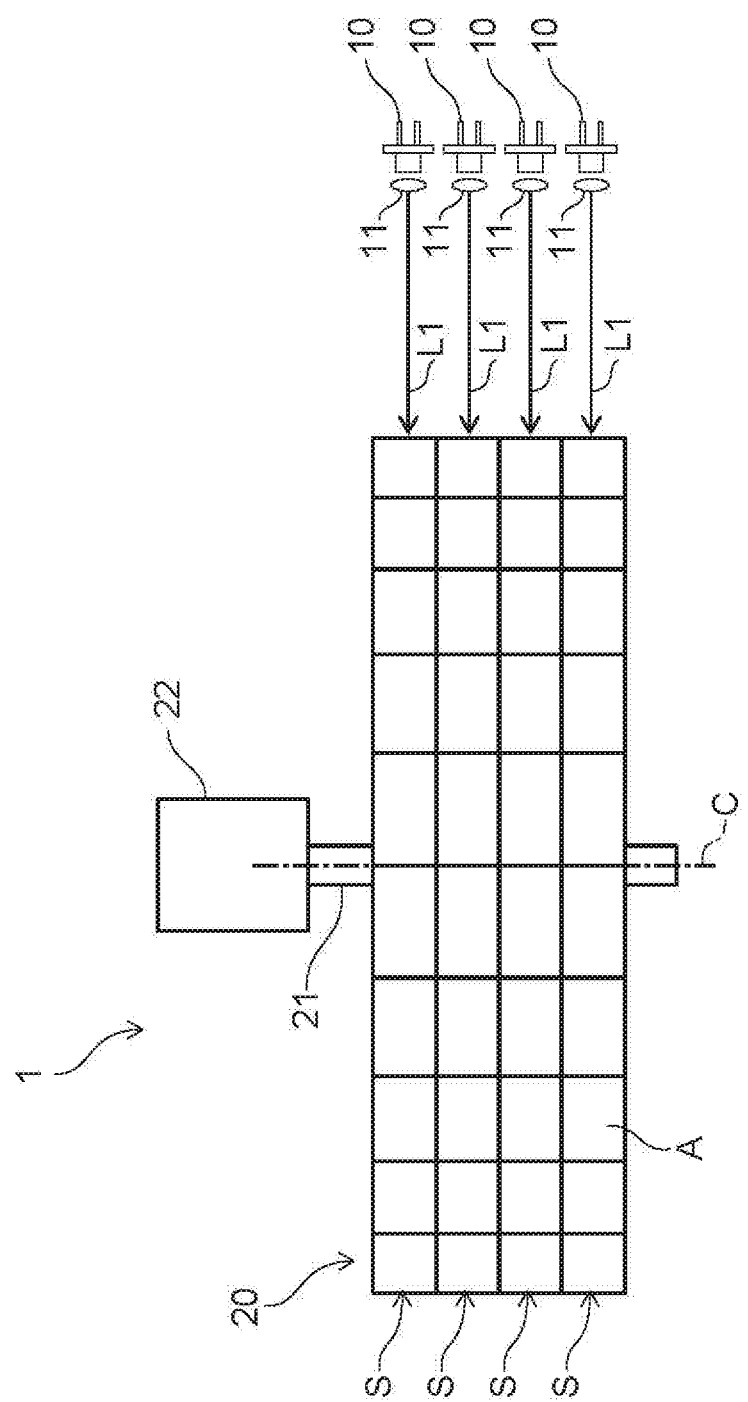
FIG. 2 is a schematic side view illustrating a laser element and a rotating member of the illumination device according to the first embodiment.

FIG. 2 is a schematic side view illustrating the laser element and the rotating member of the illumination device according to the first embodiment.

As shown in FIG. 2, in one example, the illumination device 1 includes four laser elements 10. Other appropriate number of laser elements 10 may be employed.

Examples of each laser element 10 include a laser diode (LD). In one example, a laser beam L1 emitted from each laser element 10 is a blue laser beam. The laser beam L1 emitted from each laser element 10 may have a color other than blue.

The four laser elements 10 irradiate the laser beams L1 to regions that are mutually different in the upper-lower direction of the rotating member 20 by. That is, a region on the rotating member 20 irradiated with a laser beam L1 emitted from one of the laser elements 10 and a region on the rotating member 20 irradiated with a laser beam L1 emitted from another one of the laser elements 10 are located at different locations in the upper-lower direction.

As shown in FIG. 1, each laser element 10 is spaced apart from the wavelength conversion member 30. In an example shown in FIG. 2, the four laser elements 10 are disposed along the upper-lower direction. The four laser elements 10 are configured to emit laser beams L1 in the same direction. Other arrangement of the four laser elements 10 may be employed as long as mutually different regions in the upper-lower direction of the rotating member 20 are irradiated with the laser beams L1.

For example, a collimating lens 11 is arranged at a light-emitting surface of each laser element 10. The rotating member 20 is irradiated with the laser beam L1 that has been collimated by the collimating lens 11.

The illumination device 1 includes the rotating member 20, a shaft 21 connected to the rotating member 20, and a drive unit 22 configured to rotate the shaft 21. When the shaft 21 is rotated by the drive unit 22, the rotating member 20 rotates. The drive unit 22 include, for example, a motor and the like.

Figure 3:
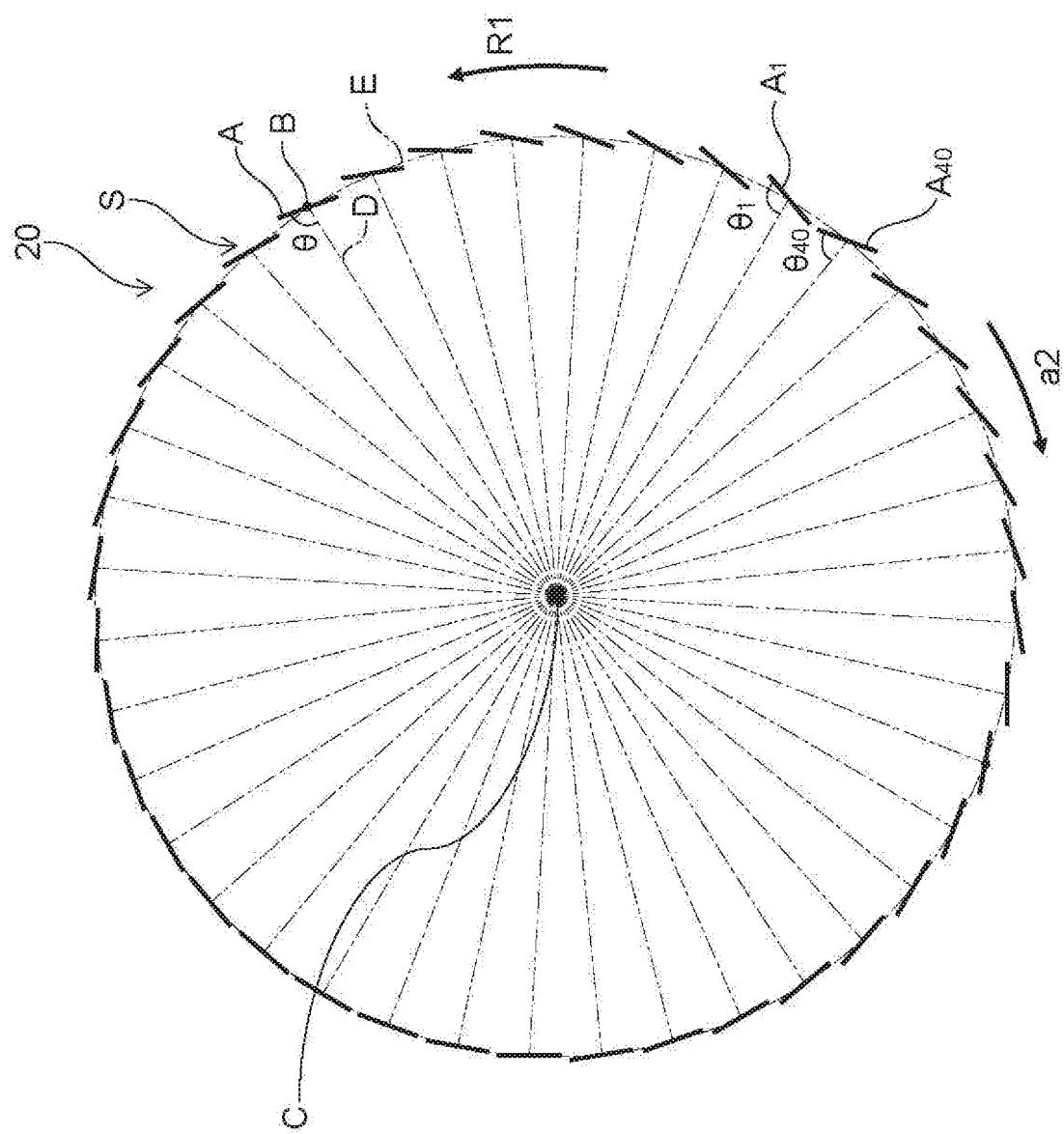
FIG. 3 is a schematic view illustrating a layout of a plurality of mirror regions of the rotating members.

FIG. 3 is a schematic view illustrating a layout of the plurality of mirror regions of the rotating members.

The rotating member 20 has, for example, forty flat mirror regions A that are disposed along a circumference direction of the rotating member 20. The forty mirror regions A that are disposed along the circumference direction are hereinafter referred to as "a mirror set S".

As shown in FIG. 2, the rotating member 20 includes four mirror sets S that are disposed along the vertical direction. The rotating member 20 may include other number of mirror sets S. Further, other number of mirror regions A may constitute each mirror set S. The laser beam L1 emitted from each of the laser elements 10 is incident on a corresponding one of the mirror sets S.

Each of the mirror regions A has, for example, a substantially rectangular shape. As shown in FIG. 3, in a top view, the centers B of respective mirror regions A in each mirror set S are, for example, located at substantially equal intervals along a circumference E about the rotation axis C. In a top view, the mirror regions A are disposed at mutually different angles θ with respect to respective ones of lines D each connecting the rotation axis C and the center B of a respective one of the 40 mirror regions A that constitute each of the mirror sets S.

In an example shown in FIG. 3, in each mirror set S, a mirror region $A_1$ that is one of the 40 mirror regions A is disposed at an angle $\theta_1$ of, for example, 110 degrees, which is the maximum. The mirror region $A_1$ that is disposed at the maximum angle θ will be hereinafter referred to as "a first mirror region $A_1$". Among the 40 mirror regions A, a mirror region that is located at i-th position when counted from the first mirror region $A_1$ in a counterclockwise direction R1 in FIG. 3 will be hereinafter referred to as "an i-th mirror region $A_i$" (i=2 to 40). An angle θ at which the i-th mirror region $A_i$ is disposed will be hereinafter referred to as "an angle $\theta_i$".

The angle θ at which each mirror region A is disposed is decreased, for example, by one degree sequentially from the first mirror region $A_1$ in a counterclockwise direction R1. That is, the angle $\theta_i$ at which the i-th mirror region $A_i$ is disposed is smaller by one degree with respect to the angle $\theta_{i-1}$ at which the (i-1)-th mirror region $A_{i-1}$ is disposed. Accordingly, the angle $\theta_{40}$ at which the 40th mirror region $A_{40}$ is disposed is, for example, 71 degrees, which is the minimum. The maximum value, the minimum value, and variations of the angle θ are not limited to the above.

For the four mirror sets S, for example, the distances between the rotation axis C and the centers B of the mirror regions A of the four mirror sets S are the same, and four mirror regions A at the same position along the circumferential direction are located at the same angle θ. With this configuration, the outputs of the laser elements 10 by the controller 50, which will be described below, can be easily controlled.

As shown in FIG. 2, for example, in the four mirror sets S, the mirror regions A are disposed at the same angles with respect to the direction in which the rotation axis C extends. In an example shown in FIG. 2, in the four mirror sets S, all mirror regions A are disposed at the angle of 0 degree with respect to the direction in which the rotation axis C extends, that is, disposed parallel to the rotation axis C. Alternatively, mirror regions A in different mirror sets S may be disposed at mutually different angles with respect to the direction in which the rotation axis C extends. This allows the vertical length of the wavelength conversion member 30 to be determined irrespective of the rotating member 20.

The rotating member 20 may, for example, be integrally formed of a metal. The rotating member 20 may have a structure in which, for example, a main body made of a resin material and having a plurality of flat areas disposed along the circumferential direction is provided with a mirror layer made of a metal. Also, in the rotating member 20, a plurality of sheet-like mirrors made of a metal may be disposed on a lateral surface of the main body.

A single mirror set S may be included in the rotating member 20. In this case, each mirror region A may have a shape elongated in the upper-lower direction, and regions at mutually different positions in the upper-lower direction of each of the mirror regions A may be irradiated with laser beams L1 from the laser elements 10.

Figure 4:
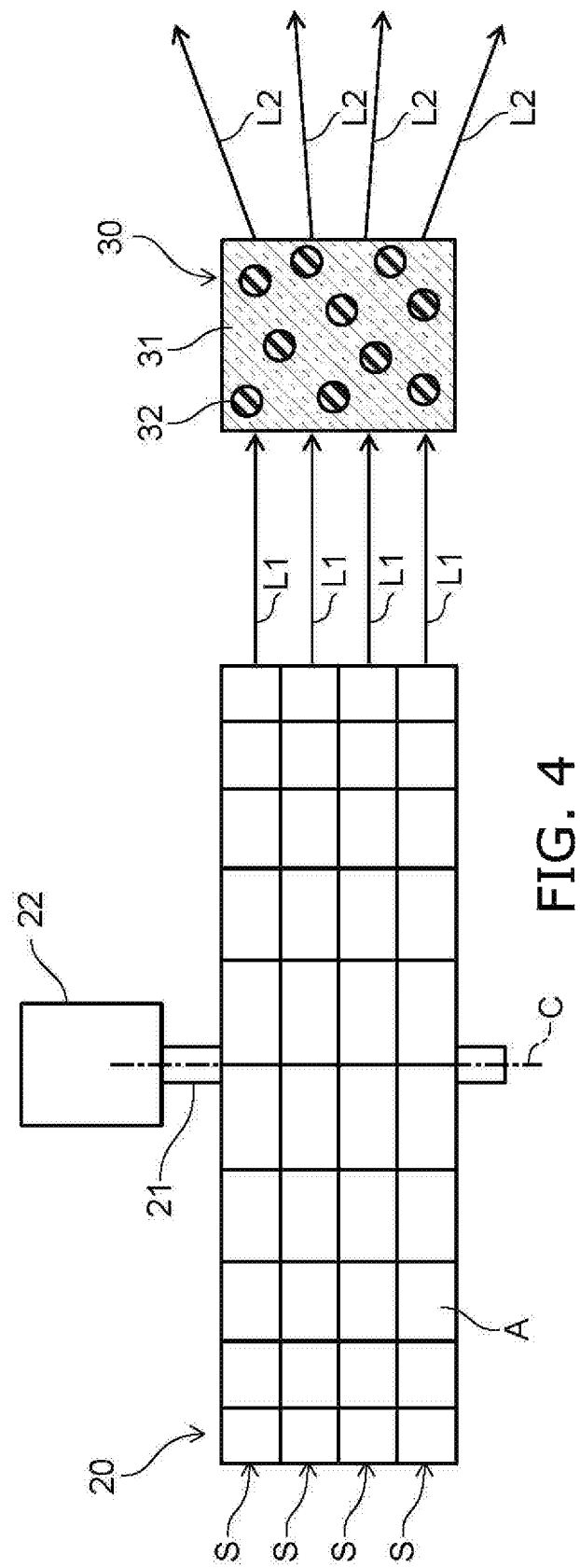
FIG. 4 schematically illustrates a lateral surface of the rotating member and a cross-section of a wavelength conversion member.

FIG. 4 schematically illustrates a lateral surface of the rotating member and a cross-section of a wavelength conversion member.

The wavelength conversion member 30 is, for example, a transmissive wavelength conversion member that transmits a portion of the incident laser beam L1. The wavelength conversion member 30 includes, for example, a light-transmissive member 31 and a wavelength conversion substance 32 dispersed in the light-transmissive member 31.

The light-transmissive member 31 has, for example, a substantially rectangular parallelepiped shape. Examples of materials for the light-transmissive member 31 include organic materials such as light-transmissive resins and inorganic materials such as light-transmissive glasses. The light-transmissive member 31 is preferably made of inorganic materials in view of heat resistance. The light-transmissive member 31 is disposed on optical paths of the laser beams L1 each of which is reflected at a corresponding one of the mirror regions A. The laser beam L1 reflected at the rotating member 20 is incident on the light-transmissive member 31. The light-transmissive member 31 transmits a portion of the incident laser beam L1. At this time, the laser beam L1 is diffused in the wavelength conversion member 30 by the wavelength conversion substance 32 and the like in the light-transmissive member 31.

As shown in FIG. 1, the light-transmissive member 31 extends in a direction intersecting the optical axes of the laser beams L1 each of which is reflected at a corresponding one of the mirror regions A. The direction in which the light-transmissive member 31 extends may be hereinafter referred to as "a lateral direction a1". The light-transmissive member 31 has a first end portion 31a near the laser element 10 and a second end portion 31b opposite to the first end portion 31a in the lateral direction a1.

As shown in FIG. 4, the wavelength conversion substance 32 is dispersed in the light-transmissive member 31. Examples of the wavelength conversion substance 32 include a phosphor that absorbs a portion of the laser beam L1 reflected at the rotating member 20 and emits yellow light. The wavelength conversion substance 32 may not be phosphors. Also, the wavelength conversion substance 32 may be configured to emit a color other than yellow.

The blue light of the laser beam L1 that is diffused in the wavelength conversion member 30 and transmits the light-transmissive member 31 is mixed with yellow light emitted from the wavelength conversion substance 32. This allows the wavelength conversion member 30 to emit, for example, white light L2.

The white light L2 emitted from the wavelength conversion member 30 is projected by the optical system 40. The light emitted from the optical system 40 is hereinafter referred to as "light L3". The optical system 40 is, for example, a combination of one or more convex lenses and one or more concave lenses (not shown). In FIG. 1, illustration of the optical system 40 is simplified.

Examples of the controller 50 include an electronic control unit (ECU) that includes control circuits each for a respective one of the laser elements 10, a control circuit for the drive unit 22, a central processing unit (CPU), memories, and the like. The controller 50 individually controls the outputs of the laser elements 10 each for a time period Δt during which each of the mirror regions A is located on the optical axis of a corresponding one of the laser beams L1. "Controlling the outputs" includes the state in which the laser elements 10 are totally turned off.

Figure 5:
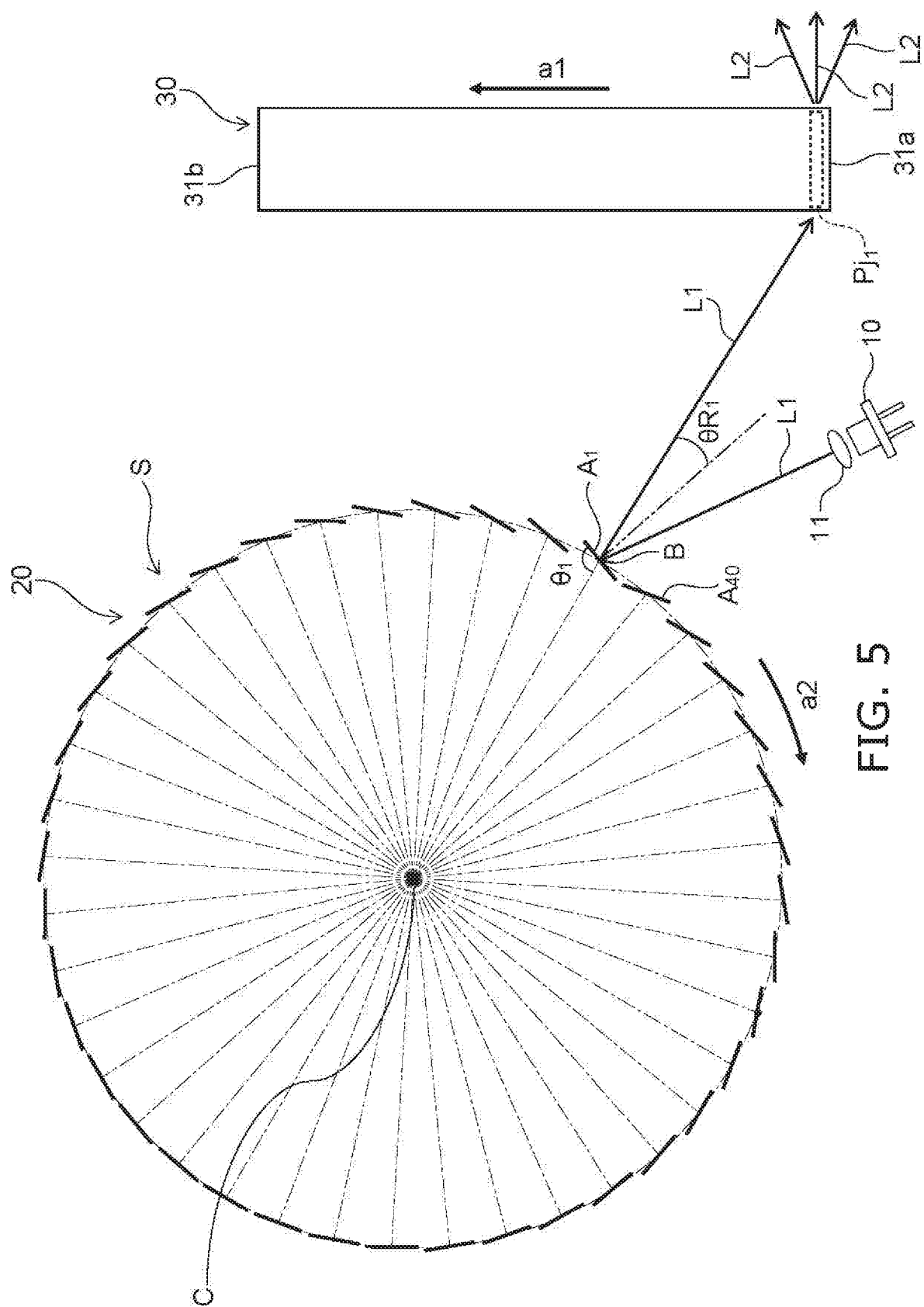
FIG. 5 is a schematic view illustrating an operation of the illumination device according to the first embodiment.
Figure 6:
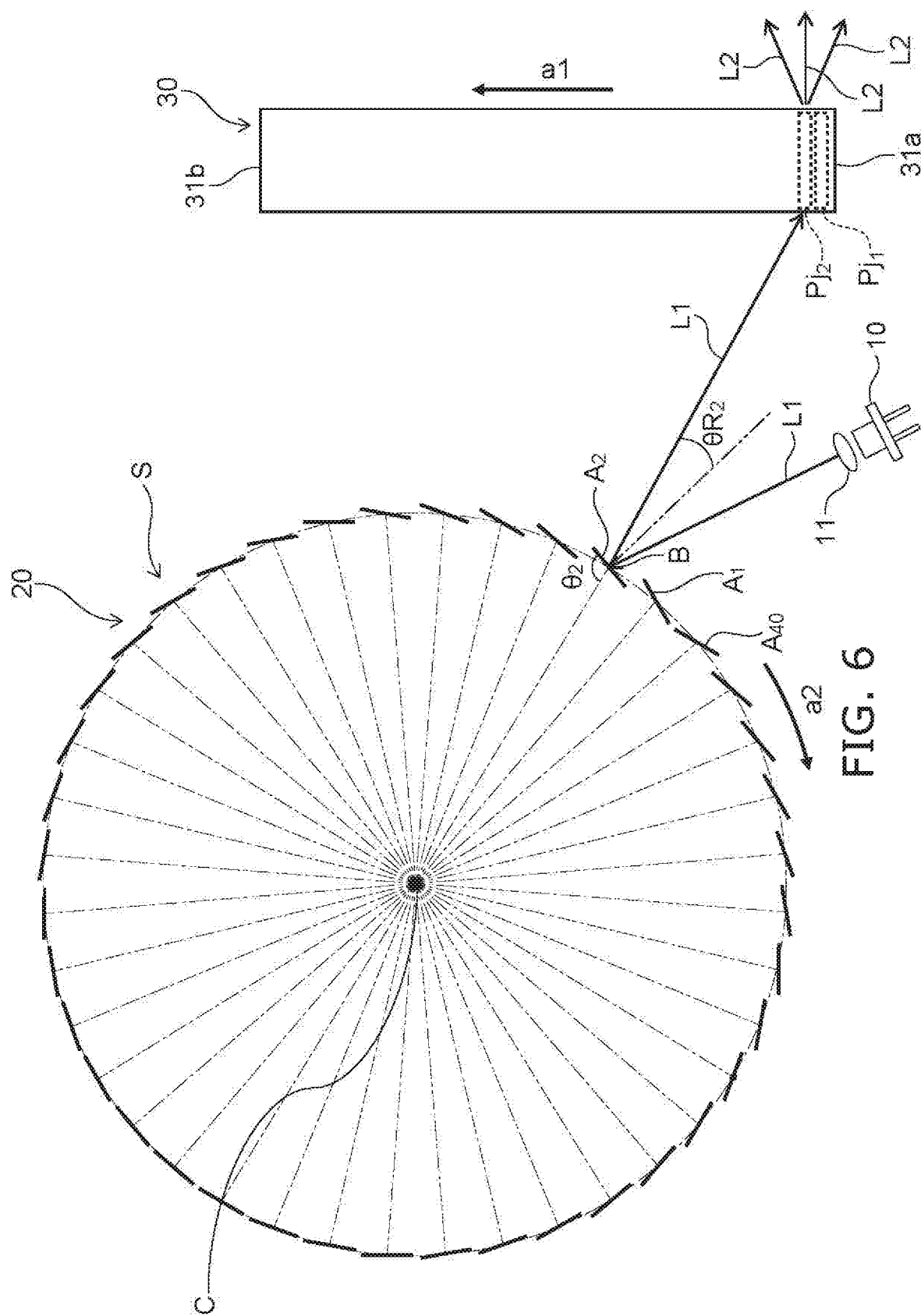
FIG. 6 is a schematic view illustrating an operation of the illumination device according to the first embodiment.
Figure 7:
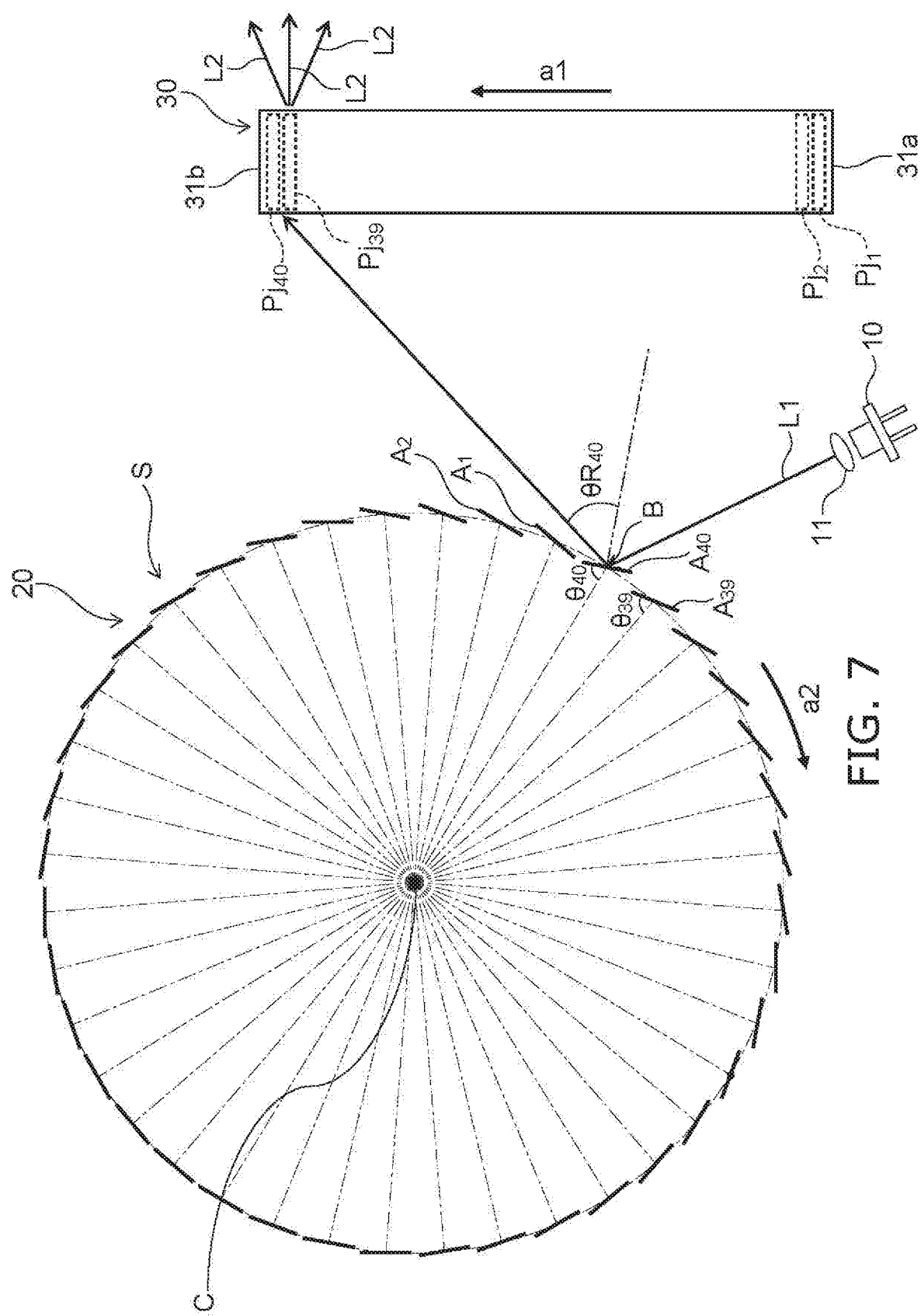
FIG. 7 is a schematic view illustrating an operation of the illumination device according to the first embodiment.

FIGS. 5 through 7 are schematic diagrams each illustrating operations of the illumination device according to the present embodiment.

Figure 8:
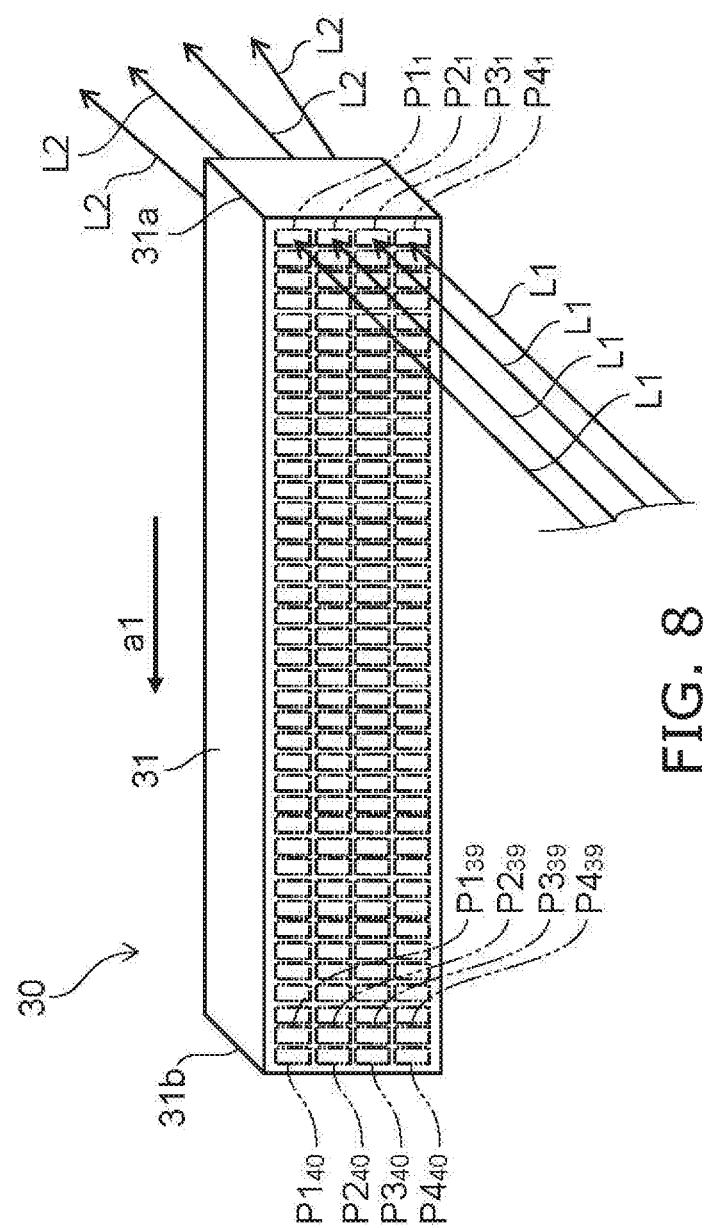
FIG. 8 is a schematic perspective view illustrating sections of the wavelength conversion member on each of which a corresponding one of laser beams is incident.

FIG. 8 is a schematic perspective view illustrating regions of the wavelength conversion member on each of which a corresponding one of the laser beams is incident.

Next, the operation of the illumination device 1 according to the present embodiment will be described.

Specifically, an example of the rotating member 20 rotated in a clockwise direction a2 shown in FIGS. 5 through 7 will be described below. The rotating member 20 may be rotated in other directions.

FIG. 5 illustrates a state in which the center B of the first mirror region $A_1$ of each of the mirror sets S is located on the optical axis of a corresponding one of the laser beams $L_1$. In this state, when the laser beam L1 is emitted from a corresponding laser element 10, the emitted laser beam L1 is reflected at the first mirror region $A_1$ at an angle of reflection $\theta R_1$.

As shown in FIG. 8, the laser beam L1 reflected at the first mirror region $A_1$ of an uppermost mirror set S of the mirror sets S is incident on a portion $P1_1$ near the first end portion 31a of the wavelength conversion member 30. A laser beam L1 reflected at the first mirror region $A_1$ of a second uppermost mirror set S of the mirror sets S is incident on a portion $P2_1$ near the first end portion 31a of the wavelength conversion member 30 below the portion $P1_1$. A laser beam L1 reflected at the first mirror region $A_1$ of a third uppermost mirror set S of the mirror sets S is incident on a portion $P3_1$ near the first end portion 31a of the wavelength conversion member 30 below the portion $P2_1$. The laser beam L1, which is reflected at the first mirror region $A_1$ of a fourth mirror set S from the top, is incident on a portion $P4_1$ near the first end portion 31a of the wavelength conversion member 30 below the portion $P3_1$. That is, the four portions $P1_1$, $P2_1$, $P3_1$, and $P4_1$ are aligned in the upper-lower direction.

Each of the portions $P1_1$, $P2_1$, $P3_1$, and $P4_1$ will be hereinafter referred to as "the first portion $Pj_1$" (j=1 to 4). With incidence of the laser beam L1, the light L2 is mainly emitted from the first portion $Pj_1$ of the wavelength conversion member 30.

In the same manner, an angle of reflection at the i-th mirror region $A_i$ of each mirror set S will be referred to as "the angle of reflection $\theta R_i$", and a portion of the wavelength conversion member 30 on which the laser beam L1 reflected at the i-th mirror region $A_i$ of a j-th uppermost mirror set S of the mirror sets S is incident will be referred to as "the i-th portion $Pj_i$".

FIG. 6 illustrates a state in which the rotating member 20 has been rotated in the clockwise direction a2 from the state of FIG. 5 and the center B of the second mirror region $A_2$ of each of the mirror sets S is located on the optical axis of a corresponding one of the laser beams L1. In this state, when the laser beam L1 is emitted from the laser element 10, the emitted laser beam L1 is reflected at the second mirror region $A_2$ at an angle of reflection $\theta R_2$. The angle $\theta_2$ at which the second mirror region A2 is disposed is smaller than the angle $\theta_1$ at which the first mirror region $A_1$ is disposed. This allows the angle of reflection $\theta R_2$ of the laser beam L1 at the center B of the second mirror region $A_2$ to be larger than the angle of reflection $\theta R_1$ of the laser beam L1 at the center B of the first mirror region $A_1$.

Accordingly, the laser beam L1 reflected at the second mirror region $A_2$ of each mirror set S is incident on the second portion $Pj_2$ at a second end portion 31b side with respect to the first portion $Pj_1$. With this configuration, the light L2 is mainly emitted from the second portion $Pj_2$ of the wavelength conversion member 30. The first portion $Pj_1$ and the second portion $Pj_2$ may partially overlap each other.

FIG. 7 illustrates a state in which the rotating member 20 has further been rotated in the clockwise direction a2 from the state of FIG. 6 and the center B of the 40th mirror region $A_{40}$ of each of the mirror sets S is located on the optical axis of a corresponding one of the laser beams L1. In this state, when the laser beam L1 is emitted from the laser element 10, the emitted laser beam L1 is reflected at the 40th second mirror region $A_{40}$.

The angle $\theta_{40}$ at which the 40th mirror region $A_{40}$ is disposed is smaller than each of the angles $\theta_1$ to $\theta_{39}$ at which the first to the 39th mirror regions $A_1$ to $A_{39}$ are disposed, respectively. This allows the angle of reflection $\theta R_{40}$ of the laser beam L1 at the center B of the 40th mirror region $A_{40}$ to be larger than each of the angles of reflection $\theta R_1$ to $\theta R_{39}$ of the laser beams L1 at the centers B of the first to the 39th mirror regions $A_1$ to $A_{39}$, respectively. Accordingly, the laser beam L1 reflected at the 40th mirror region $A_{40}$ is incident on a 40th portion $Pj_{40}$ that is closer to the second end portion 31b than the 39th portion $Pj_{39}$ in the wavelength conversion member 30. The 40th portion $Pj_{40}$ is, for example, located near the second end portion 31b. With this configuration, the light L2 is mainly emitted from the 40th portion $Pj_{40}$ of the wavelength conversion member 30.

Accordingly, as shown in FIG. 8, each of the mirror sets S can reflect the laser beams L1 toward a corresponding one of the portions $P1_i$ to $P4_i$ that are mutually different in the vertical direction of the wavelength conversion member 30. Each of the 40 mirror regions A of each mirror set S can reflect the laser beams L1 toward a corresponding one of the portions $Pj_1$ to $Pj_{40}$ that are mutually different in the lateral direction a1 of the wavelength conversion member 30. The light L2 emitted from each of the portions $P1_1$ to $P1_{40}$, $P2_1$ to $P2_{40}$, $P3_1$ to $P3_{40}$, and $P4_1$ to $P4_{40}$ of the wavelength conversion member 30 is projected by the optical system 40. That is, the light L2 that is emitted from each of the portions $P1_1$ to $P1_{40}$, $P2_1$ to $P2_{40}$, $P3_1$ to $P3_{40}$, and $P4_1$ to $P4_{40}$ of the wavelength conversion member 30 and that is incident on the optical system 40 is projected in mutually different directions by the optical system 40. This configuration allows the illumination device 1 to distribute the light L3 in the upper-lower direction and in the lateral direction a1.

The description above shows an example in which the angles θ at which the plurality of mirror regions A constituting each mirror set S are disposed are varied along the circumference direction by predetermined degrees (for example, by one degree). In this case, as described above, when the rotating member 20 is rotated to change the mirror region A irradiated with the laser beam L1, a portion of the wavelength conversion member 30 irradiated with the laser beam L1 is shifted sequentially in the lateral direction a1. Alternatively, the plurality of mirror regions A that constitutes each mirror set S may be arranged at mutually different angles θ without regularity along the circumference direction. In this case, when the rotating member 20 is rotated to change the mirror region A irradiated with the laser beam L1, a portion of the wavelength conversion member 30 irradiated with the laser beam L1 is shifted irregularly in the lateral direction a1.

Figure 9:
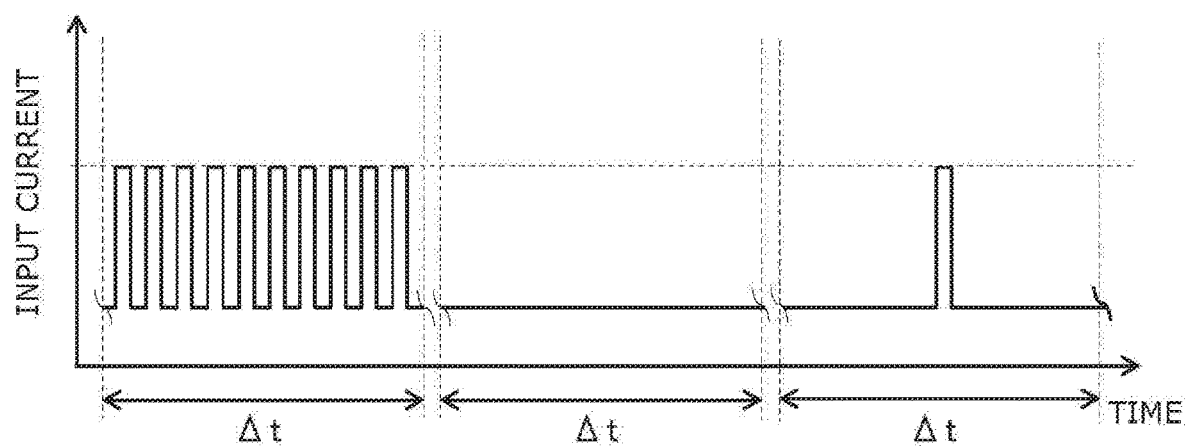
FIG. 9 is a graph illustrating control signals of the laser element from a controller of the illumination device according to the first embodiment.

FIG. 9 is a graph illustrating control signals of the laser element from the controller of the illumination device according to the present embodiment.

The controller 50, for example, individually controls the outputs of the laser elements 10. The controller 50, for example, individually adjusts the number of pulses of the input current to each of the laser elements 10 for a time period Δt during which each of the mirror regions A is located on the optical axis of a corresponding one of the laser beams L1. The larger the number of pulses to be input for a time period Δt, the longer the total light-emitting time of the laser element 10 for the time period Δt. The longer the total light-emitting time of the laser element 10 for a time period Δt, the higher the luminous intensity of the light L2 emitted from the wavelength conversion member 30 during the time period Δt. The laser element 10 can be turned off during a time period Δt by setting the number of pulses of the input current for the time period Δt to zero. This allows for individually selecting portions of the wavelength conversion member 30 to emit the light L2. Further, in the case in which the illumination device 1 emits the light L2, the luminous intensity of the emitted light L2 can be adjusted.

Figure 10:
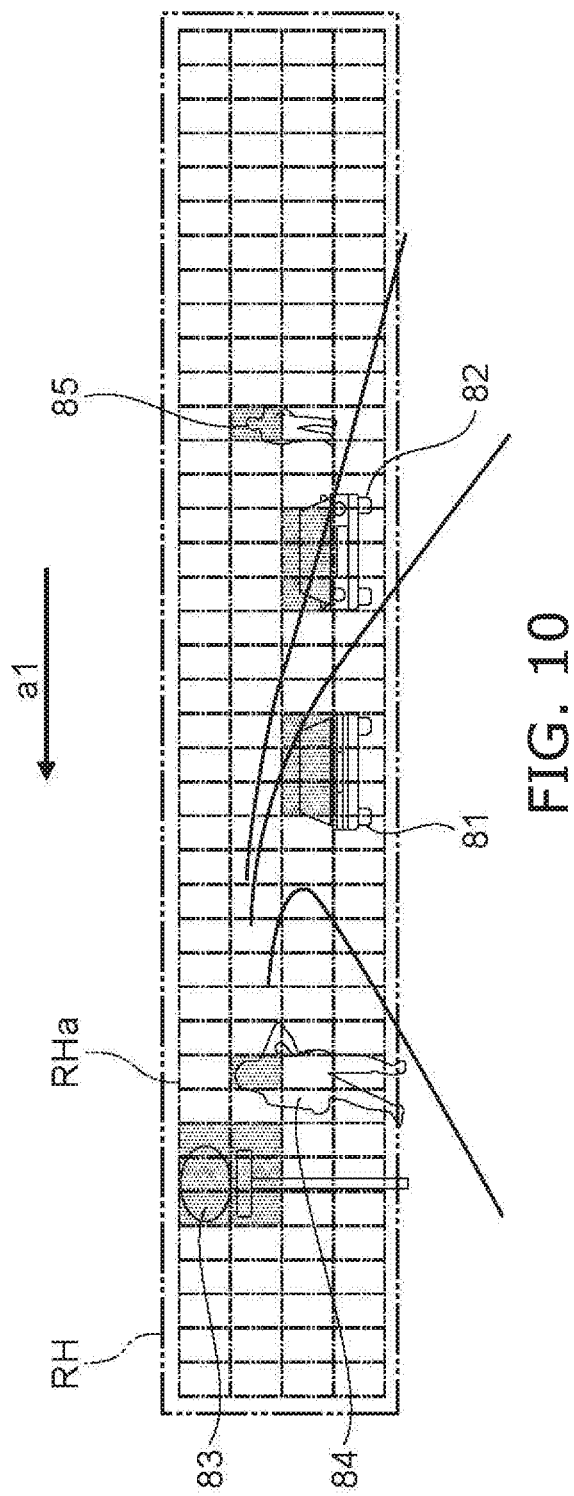
FIG. 10 is a schematic view illustrating an operation of a headlight to which the illumination device according to the first embodiment is applied.

FIG. 10 is a schematic view illustrating an operation of a headlight to which the illumination device according to the present embodiment is applied.

Examples of applications of the illumination device 1 include a high-beam unit of a headlight mounted in a vehicle.

As described above, the outputs of the four laser elements 10 are individually controlled and each of the mutually different areas in the vertical direction of the rotating member 20 are irradiated with the laser beams L1 from a corresponding one of the four laser elements 10. Hence, as shown in FIG. 10, a high beam area RH can be divided into the four columns in the vertical direction. Further, the high beam area RH can be divided, for example, into 40 rows in the lateral direction a1 according to a time period Δt during which each of the mirror regions A of the mirror set S is located on the optical axis of a corresponding one of the laser beams L1. Accordingly, the high beam area RH can be divided into four columns in the vertical direction and 40 rows in the lateral direction, that is, 160 small areas RHa in total. It is noted that each of the small areas RHa corresponding to time periods Δt may partially overlap with other adjacent small areas RHa in the lateral direction a1.

A sensor mounted in a vehicle (not shown) detects a preceding vehicle 81, an oncoming vehicle 82, a sign 83, and pedestrians 84 and 85 in the high beam area RH. Based on the signal detected by the sensor, the controller 50 adjusts the number of pulses to be input to the laser element 10 for each time period corresponding to the small area RHa.

With this configuration, for example, the illumination device 1 projects light onto an area out of the high beam area RH except for a rear windshield of the preceding vehicle 81. Also, for example, the illumination device 1 projects light onto an area out of the high beam area RH except for a windshield of the oncoming vehicle 82. For example, the illumination device 1 projects light with reduced intensity onto the sign 83. This can reduce reflection glare. For example, the illumination device 1 projects light with high intensity onto body portions of the pedestrians 84 and 85 except for their heads. This can emphasize presence of the pedestrians 84 and 85. Accordingly, visibility of a driver of the vehicle can be increased without dazzling a driver of the preceding vehicle 81, a driver of the oncoming vehicle 82, and the pedestrians 84 and 85.

Next, the effects that can be obtained in the present embodiment will be described below.

The illumination device 1 according to the present embodiment includes a laser element 10, a rotating member 20, and a wavelength conversion member 30. The rotating member 20 has the plurality of flat mirror regions A that are disposed along a circumference direction of the rotating member to sequentially reflect laser beams L1 emitted from the laser element 10 with rotation of the rotating member. The laser beams L1 reflected at the plurality of mirror regions A are incident on the wavelength conversion member 30. When viewed in a direction in which the rotation axis C of the rotating member 20 extends, the plurality of mirror regions A are disposed at mutually different angles θ with respect to a line D extending from the rotation axis C to the center B of each of the mirror regions A. This allows the plurality of mirror regions A disposed along the circumference direction to reflect the laser beams L1 toward mutually different sections of the wavelength conversion member 30. With this arrangement, the illumination device 1 is obtained in which the scanning range of the laser beam can be expanded compared with an illumination device in which a plurality of mirror regions are disposed at the same angle.

Accordingly, the illumination device 1 can project light onto a larger area. Alternatively, while keeping the projection area to be the same size as the conventional projection area, the illumination device 1 can be smaller in size by using a compact light source that densifies the laser beam.

An area on the rotating member 20 irradiated with a laser beam L1 emitted from one of the laser elements 10 is different from an area on the rotating member 20 irradiated with a laser beam L1 emitted from another one of the laser elements 10 in a direction in which the rotation axis C extends. This configuration allows the illumination device 1 to distribute the light L2 in the direction in which the rotation axis C extends.

Each laser element 10 and the wavelength conversion member 30 are spaced apart from each other. Accordingly, the wavelength conversion member 30 has a good heat dissipation.

The wavelength conversion member 30 is a transmissive wavelength conversion member. With the transmissive wavelength conversion member 30, the illumination device 1 with a reduced length in the direction in which the rotation axis C extends can be obtained. Accordingly, even when a space for the illumination device 1 is reduced in the direction in which the rotation axis C extends, the illumination device 1 can be disposed therein.

The illumination device 1 further includes an optical system 40 that projects light L2 emitted from the wavelength conversion member 30. The light L2 that is emitted from each of the portions $P1_1$ to $P1_{40}$, $P2_1$ to $P2_{40}$, $P3_1$ to $P3_{40}$, and $P4_1$ to $P4_{40}$ of the wavelength conversion member 30 and that is incident on the optical system 40 is projected by the optical system 40 toward mutually different directions. This configuration allows the illumination device 1 to distribute the light L3 vertically and in the lateral direction a1.

The illumination device 1 further includes the controller 50 that controls operations of the laser elements 10 and the rotating member 20. The controller 50 controls outputs of the laser elements 10 each for a time period $\Delta t$ during which each of the mirror regions A is located on the optical axis of a corresponding one of the laser beams L1. Accordingly, the illumination device 1 can project light onto a selected area.

Second Embodiment

Next, a second embodiment will be described.

Figure 11:
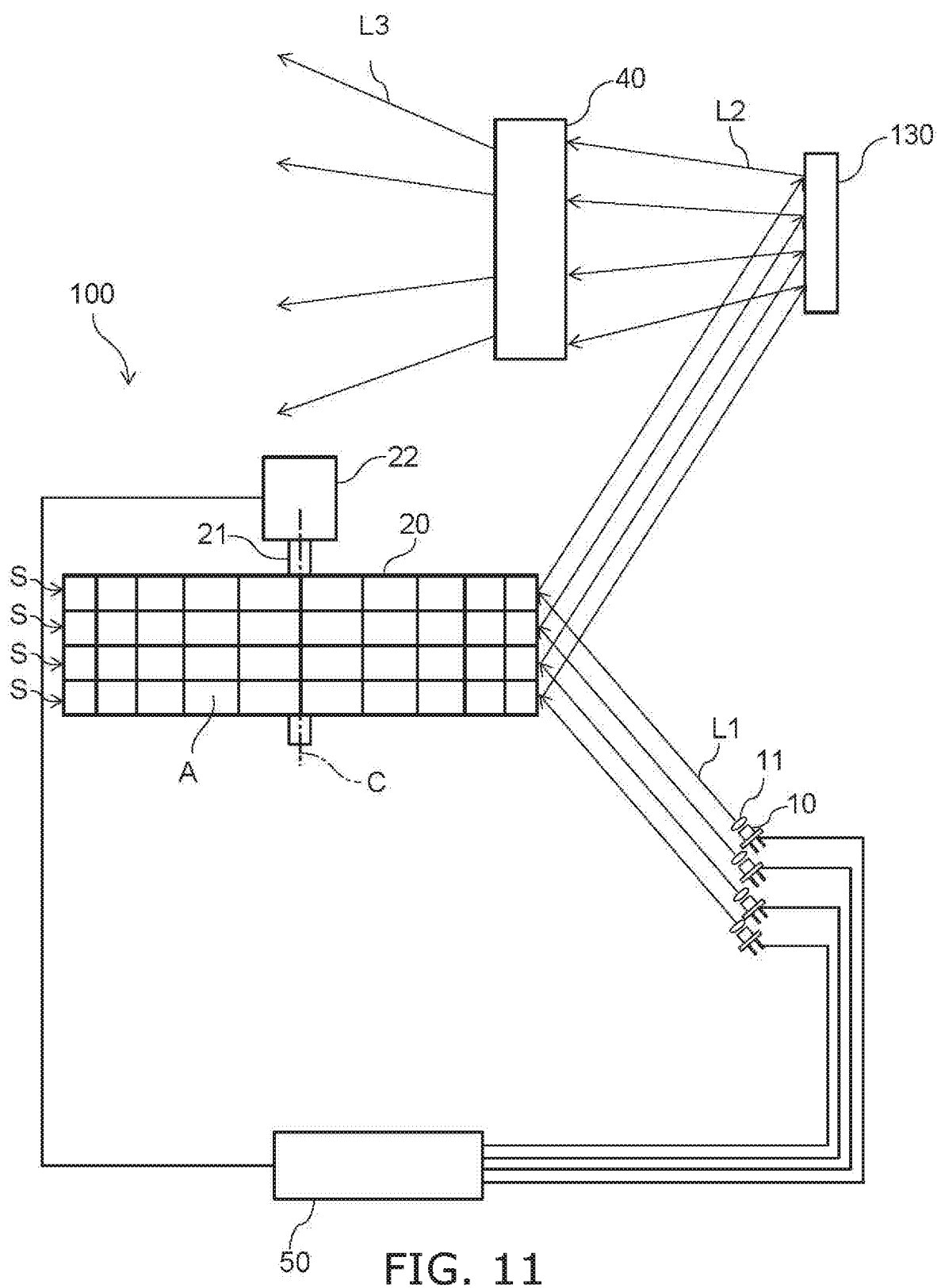
FIG. 11 is a schematic view illustrating an illumination device according to a second embodiment.

FIG. 11 is a schematic view illustrating an illumination device according to the second embodiment.

The illumination device 100 according to the second embodiment differs from the illumination device 1 according to the first embodiment in that a wavelength conversion member 130 is reflective. Only differences from the first embodiment will be mainly described below. Except for configurations in the descriptions below, the second embodiment has the same configurations as in the first embodiment.

Each of the laser elements 10 is, for example, disposed such that the laser beam L1 is incident on a respective one of the mirror sets S of the rotating member 20 from below the respective mirror sets S. Each mirror set S of the rotating member 20, for example, reflects a respective one of the laser beams L1 upward.

Figure 12:
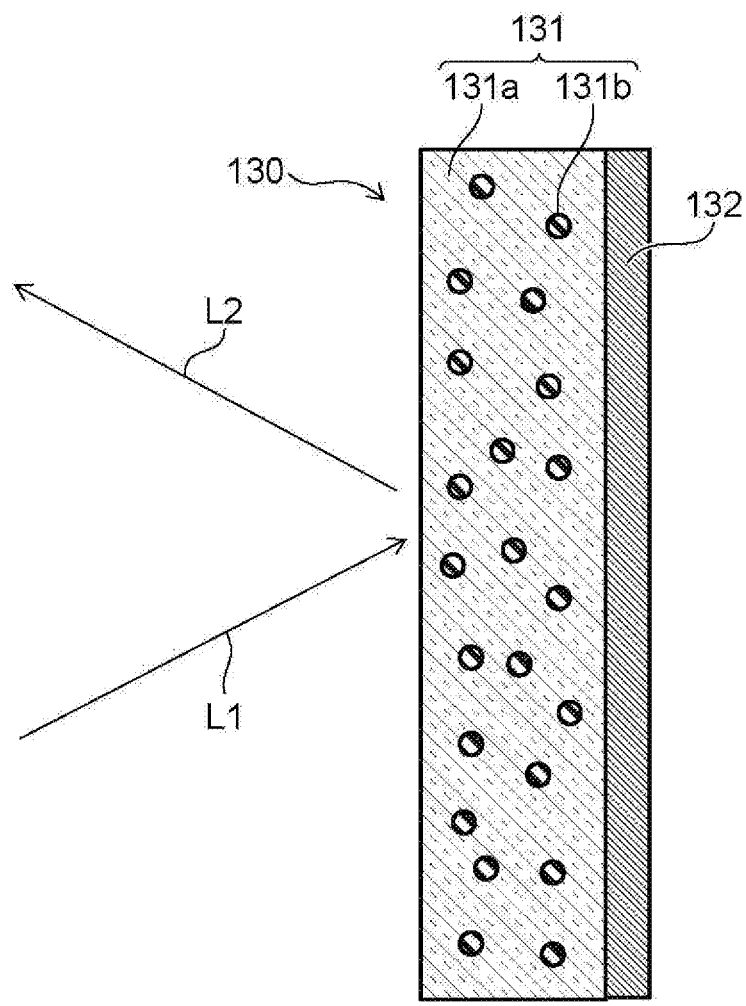
FIG. 12 is a schematic sectional view illustrating a wavelength conversion member of the illumination device according to the second embodiment.

FIG. 12 is a schematic sectional view illustrating the wavelength conversion member according to the second embodiment.

The wavelength conversion member 130 is, for example, a reflective wavelength conversion member that reflects a portion of the incident laser beams L1. The wavelength conversion member 130 includes, for example, a wavelength conversion layer 131 and a reflective layer 132 that reflects light emitted from the wavelength conversion layer 131.

The wavelength conversion layer 131 includes, for example, a light-transmissive layer 131a and a wavelength conversion substance 131b in the light-transmissive layer 131a.

Examples of materials for the light-transmissive layer 131a include organic materials such as light-transmissive resins and inorganic materials such as light-transmissive glasses. The light-transmissive member 31 is preferably made of inorganic materials in view of heat resistance. The laser beams L1 reflected at the rotating member 20 are incident on the light-transmissive layer 131a. The light-transmissive layer 131a transmits a portion of the incident laser beams L1. At this time, the laser beams L1 are diffused in the wavelength conversion layer 131a by the wavelength conversion substance 131b and the like in the light-transmissive layer 131.

The wavelength conversion substance 131b is dispersed in the light-transmissive layer 131a. Examples of the wavelength conversion substance 131b include a phosphor that absorbs a portion of the laser beams L1 reflected at the rotating member 20 and emits yellow light.

Examples of materials for the reflective layer 132 include ceramics and metal plates with high reflectance. In one example, the reflective layer 132 reflects the blue laser beam L1 that is diffused in the wavelength conversion layer 131 and transmitted through the light-transmissive layer 131a, and the yellow light that is emitted from the wavelength conversion substance 131b. This allows the wavelength conversion member 130 to emit white light L2. The white light L2 emitted from the wavelength conversion member 130 is projected by the optical system 40.

Next, the effects that can be obtained in the second embodiment will be described below.

The illumination device 100 according to the second embodiment includes the wavelength conversion member 130 that is a reflective wavelength conversion member Compared with the transmissive wavelength conversion member 30, the reflective wavelength conversion member 130 has a high heat dissipation and allows for efficiently extracting the light L2. With the reflective wavelength conversion member 130, the illumination device 100 with a reduced length in the direction intersecting the direction in which the rotation axis C extends can be obtained. Accordingly, even when a space for the illumination device 100 is reduced in the direction intersecting the direction in which the rotation axis C extends, the illumination device 100 can be disposed therein.

Examples of application of the present invention include illumination devices such as headlights, spotlights, and lightings for projection mapping.

It is to be understood that although certain embodiments of the present invention have been described, various other embodiments and variants may occur to those skilled in the art that are within the scope and spirit of the invention, and such other embodiments and variants are intended to be covered by the following claims.

What is claimed is:

1. An illumination device comprising:
   a laser element;
   a rotating member having a plurality of flat mirror regions that are disposed along a circumference direction of the rotating member to sequentially reflect laser beams emitted from the laser element with rotation of the rotating member; and
   a wavelength conversion member, wherein each of the laser beams reflected at a corresponding one of the mirror regions is incident on the wavelength conversion member, and wherein the mirror regions are disposed at mutually different angles with respect to respective ones of lines each connecting a rotation axis of the rotating member and a center of a respective one of the plurality of mirror regions when viewed in a direction in which the rotation axis extends.

2. The illumination device according to claim 1, further comprising an additional laser element, wherein an area on the rotating member that is irradiated with the laser beam emitted from the laser element is different from an area on the rotating member that is irradiated with a laser beam emitted from the additional laser element in a direction in which the rotation axis extends.

3. The illumination device according to claim 1, wherein the laser element and the wavelength conversion member are spaced apart from each other.

4. The illumination device according to claim 1, wherein the wavelength conversion member comprises a light-transmissive member and a wavelength conversion substance in the light-transmissive member.

5. The illumination device according to claim 1, wherein the wavelength conversion member comprises a wavelength conversion layer and a reflective layer that reflects light emitted from the wavelength conversion layer.

6. The illumination device according to claim 1, further comprising an optical system that projects light emitted from the wavelength conversion member.

7. The illumination device according to claim 1, further comprising a controller configured to control operation of the laser element and the rotating member, wherein the controller is configured to control an output of each of the laser elements for a time period during which each of the mirror regions is located on the optical axis of a corresponding one of the laser beams.

8. The illumination device according to claim 2, wherein the wavelength conversion member and each of the laser element and the additional laser element are spaced apart from each other.

9. The illumination device according to claim 2, further comprising a controller configured to control operation of the laser element and the rotating member, wherein the controller is configured to control an output of each of the laser element and the additional laser element for a time period during which each of the mirror regions is located on the optical axis of a corresponding one of the laser beams.

* * * * *